US012794587B2

(12) United States Patent
Albero et al.

(10) Patent No.: US 12,794,587 B2
(45) Date of Patent: Nov. 10, 2026

(54) SYSTEM AND METHOD FOR ESTABLISHING AND UTILIZING COMMUNICATION PIPELINES

(71) Applicant: Bank of America Corporation, Charlotte, NC (US)

(72) Inventors: George Albero, Charlotte, NC (US); Ratnakar D. Madduri, Charlotte, NC (US); Ganesh N. Bhat, Robbinsville, NJ (US); Naga Vamsi Krishna Akkapeddi, Charlotte, NC (US); Aleem A. Qureshi, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 19/171,001

(22) Filed: Apr. 4, 2025

(65) Prior Publication Data

US 2026/0312721 A1 Oct. 8, 2026

(51) Int. Cl.
*H04L 41/16* (2022.01)
*H04L 1/00* (2006.01)

(52) U.S. Cl.
CPC ............ *H04L 1/0052* (2013.01); *H04L 41/16* (2013.01)

(58) Field of Classification Search
CPC .............................. H04L 1/0052; H04L 41/16
See application file for complete search history.

(56) References Cited

U.S. PATENT DOCUMENTS

| | | | |
|---|---|---|---|
| 7,734,775 B2 | 6/2010 | Barnett et al. | |
| 8,261,005 B2 | 9/2012 | Flynn et al. | |
| 9,846,581 B2 | 12/2017 | Huang et al. | |
| 10,552,160 B2 | 2/2020 | Caulfield et al. | |
| 10,708,189 B1 * | 7/2020 | Agrawal | H04L 49/3009 |
| 10,853,059 B2 | 12/2020 | Mills | |
| 10,868,815 B2 | 12/2020 | Love et al. | |
| 10,880,292 B2 | 12/2020 | Koottayi et al. | |
| 11,281,457 B2 | 3/2022 | Jodoin et al. | |
| 11,520,799 B2 | 12/2022 | Hollander et al. | |
| 11,630,691 B2 | 4/2023 | Pawlowski et al. | |
| 11,677,417 B2 | 6/2023 | Indeck et al. | |
| 11,841,811 B2 | 12/2023 | Prabhakar et al. | |

(Continued)

FOREIGN PATENT DOCUMENTS

WO WO-2023169646 A1 * 9/2023 ............ G06N 20/00

*Primary Examiner* — Dhairya A Patel

(57) ABSTRACT

A system includes a memory storing an AI model and a processor coupled to the memory. The processor detects an interaction to be initiated on an application. The processor then detects network status of a network associated with communication pipelines configured to process interactions. The processor then executes the AI model to identify communication pipelines appropriate for processing the interaction. The processor then assigns a first token to the remaining communication pipelines not appropriate for processing the interaction to deactivate them and a second token to activate the communication pipelines appropriate for processing the interaction based on a time period specified by the second token. The processor then generates a third token specifying selected communication pipelines and transmit the third token to the application. The third token is configured to cause the application to process the interaction using the selected communication pipelines.

20 Claims, 3 Drawing Sheets

(56) References Cited

U.S. PATENT DOCUMENTS

| | | | | |
|---|---|---|---|---|
| 11,902,289 | B2 | 2/2024 | Dunjic et al. | |
| 12,118,559 | B2 | 10/2024 | Wong et al. | |
| 12,387,132 | B1 * | 8/2025 | Tong | G06F 16/9024 |
| 2014/0006273 | A1 * | 1/2014 | Gopinath | G06Q 20/10 705/40 |
| 2014/0180870 | A1 * | 6/2014 | Bombeck | H04L 63/108 705/26.35 |
| 2017/0034023 | A1 * | 2/2017 | Nickolov | H04L 43/0817 |
| 2023/0153183 | A1 | 5/2023 | Adolfsson et al. | |
| 2023/0351292 | A1 | 11/2023 | Cella et al. | |
| 2024/0290182 | A1 * | 8/2024 | Sethia | G07F 19/209 |

* cited by examiner

SYSTEM AND METHOD FOR ESTABLISHING AND UTILIZING COMMUNICATION PIPELINES

TECHNICAL FIELD

The present disclosure relates generally to communication pipelines, and more specifically, to establishing and utilizing communication pipelines.

BACKGROUND

A communication pipeline refers to a series of connected processes or stages where data flows sequentially from one to the next, allowing different parts of a program to communicate and exchange information and operate on the information efficiently. It is often used in scenarios where multiple processes need to work together to complete a complex task.

SUMMARY

In a conventional decentralized network, interactions are processed based on design time agreements among diverse applications. These interactions may be complex and the volume of them is high. Each interaction can go through various communication pipelines when being processed by an application. Communication pipelines are designed to sequentially process interactions. Conventional systems may be unable to adapt communication pipelines for interactions, which means an interaction may need to go through all the communication pipelines no matter whether they are required. One problem is that by going through all the communication pipelines, interactions spend too much time in the application and consume too many computing resources (such as RAM). Because these interactions take too much time in one application and consume too many computing resources, other interactions cannot get into the application for processing and get dropped by the conventional systems, which cause data loss. Another problem is that processing many of these interactions depends on some prior interactions being completed, which leads to the situation where one failed communication pipeline for an interaction may cause many downstream interactions get held up and dropped. When interactions get dropped, data loss occurs, which may lead to failures of downstream systems. Another problem is that if an interaction takes too long to get processed by going through all the communication pipelines, it may cause a significant influx of interactions waiting to be processed by the application. The significant influx of interactions may consume too many computing resources in a short amount of time, which may cause system hangups or crashes.

The system disclosed in the present application provides a technical solution to the problems discussed above. The disclosed system can effectively establish and utilize communication pipelines by using an AI model and assigning different types of tokens to the communication pipelines. When detecting an interaction to be initiated on an application, the disclosed system executes the AI model to identify the interaction type and communication pipelines needed for that interaction type. The system further predicts network status and establishes communication pipelines according to the predicted network status. The system identifies which communication pipelines can act in parallel so that they can process the interaction in parallel. The system identifies which communication pipelines need to act sequentially so that they would process the interaction sequentially. The system further generates different types of tokens and assign them to the communication pipelines. The system may generate a deactivation token to deactivate the communication pipelines that are no needed for the interaction. The system may generate a bearer token for auto-orchestration of the interaction to the right communication pipelines. The system may generate a short-lived token to make the communication pipelines needed for the interaction active for the time period indicated in the short-lived token. Once the time period is reached, the communication pipeline will be deactivated, thereby releasing the computing resources.

In an embodiment, the disclosed system includes a memory operable to store an artificial-intelligence (AI) model trained from training data including a plurality of interactions, a plurality of applications capable of processing the plurality of interactions, and a plurality of communication pipelines designated to process each of the plurality of interactions by each of the plurality of applications. Training the AI model may include learning relationships between the plurality of interactions, applications, and communication pipelines through iterative adjustments of hyperparameters of the AI model using one or more optimization algorithms. The disclosed system also includes a processor operably coupled to the memory. The processor is configured to detect, based on a signal from an application, that a first interaction is to be initiated on the application. The processor is then configured to detect, based on live network signals and historical network signals from a network, a network status associated with the network. The network is associated with a plurality of communication pipelines configured to process interactions. The processor is then configured to execute the AI model on the first interaction and the network status to identify one or more first communication pipelines appropriate for processing the first interaction. The plurality of communication pipelines include the first communication pipelines and remaining communication pipelines not appropriate for processing the first interaction. The processor is then configured to generate, by the AI model, a first token representing a first command configured to deactivate the remaining communication pipelines. The processor is then configured to assign, by the AI model, the first token to the remaining communication pipelines to deactivate the remaining communication pipelines. The processor is then configured to generate, by the AI model, a second token representing a second command configured to activate the first communication pipelines based on a first time period specified by the second token. The processor is then configured to assign, by the AI model, the second token to the first communication pipelines to keep the first communication pipelines active for the first time period. The processor is then configured to generate, by the AI model, a third token representing a third command configured to specify one or more selected first communication pipelines of the first communication pipelines. The processor is further configured to transmit the third token to the application. The third token is configured to cause the application to process the first interaction using the selected first communication pipelines.

In an embodiment, the processor of the disclosed system is further configured to identify a subset of the first communication pipelines that can process the first interaction in parallel. The selected first communication pipelines include two or more of the subset of the first communication pipelines. The first interaction is processed by the two or more of the subset of the first communication pipelines in parallel.

In an embodiment, the processor of the disclosed system is further configured to identify a subset of the first communication pipelines that process the first interaction sequentially. The selected first communication pipelines include two or more of the subset of the first communication pipelines. The first interaction is processed by the two or more of the subset of the first communication pipelines sequentially.

In an embodiment, the processor of the disclosed system is further configured to determine that two or more of the first communication pipelines are connected and work unified instead of operating independently. The processor is then configured to execute the AI model to create a script configured to split the two or more of the first communication pipelines. The processor is then configured to execute the script on the two or more of the first communication pipelines to cause the two or more of the first communication pipelines to operate independently.

In an embodiment, the network status indicates that the network has an available bandwidth lower than a threshold bandwidth. The second token is generated responsive to detecting that the network has the available bandwidth lower than the threshold bandwidth.

In an embodiment, the processor of the disclosed system is further configured to detect one or more of the first communication pipelines are actively processing one or more second interactions. The third token is generated responsive to the detection. The selected first communication pipelines are from the remaining first communication pipelines.

In an embodiment, the network status indicates that the network has an available bandwidth lower than a threshold bandwidth. The processor of the disclosed system is further configured to determine a priority of the first interaction is lower than a threshold level. The processor is then configured to generate, by the AI model, a fourth token representing a fourth command configured to suspend a processing of the first interaction for a second time period specified by the fourth token. The processor is then configured to transmit the fourth token to the application. The fourth token is configured to cause the application to suspend the processing of the first interaction using the selected first communication pipelines for the second time period.

The disclosed system and methods provide the practical application of effectively establishing and utilizing communication pipelines. Conventional systems are unable to adapt communication pipelines for interactions, leading to some interactions taking too much time in one application and consuming too many computing resources while other interactions being dropped to cause data loss and downstream system failure. In addition, with the communication pipelines in conventional systems, one failed communication pipeline for an interaction may cause many downstream interactions get held up and dropped, which also causes data loss and downstream system failure. Furthermore, conventional systems may experience a significant influx of interactions waiting to be processed by the application, which may cause system hangups or crashes. The disclosed system and methods can address such problems by using an AI model to determine which communication pipelines are needed for an interaction and establishing communication pipelines according to the network status. The disclosed system and methods then identify communication pipelines that can process the interaction in parallel and have these communication pipelines process the interaction in parallel, which can speed up the processing of entire interaction. The disclosed system and methods further generate a deactivation token to deactivate the communication pipelines that are no needed for the interaction. In this way, communication pipelines not needed for the interaction can be utilized by other interactions, thereby improving the utilization of the computing resources. The disclosed system and methods further generate a short-lived token to make the communication pipelines needed for the interaction active for the time period indicated in the short-lived token. Once the time period is reached, the communication pipeline will be deactivated, thereby releasing the computing resources for other interactions to use. The disclosed system and methods can effectively utilize the computing resources, which ensures all interactions can be processed in time, thereby preventing data loss and downstream system failure.

Technical advantages of certain embodiments of this disclosure may include one or more of the following. By using use an AI model to analyze an interaction and network status and determine what communication pipelines should be activated and for how long, the disclosed system and methods can ensure that only necessary communication pipelines are used to process the interaction given the network status. In this way, communication pipelines not needed for the interaction can be utilized by other interactions, thereby increasing utilization of all the communication pipelines. For example, there are communication pipelines configured for validation, collection, aggregation, transformation, correction, formatting, posting, and provisioning. The disclosed system and methods can determine an interaction only needs the communication pipelines configured for validation, transformation, formatting, and posting. The remaining communication pipelines can be deactivated to save computing resources or used by other interactions to prevent other interaction being dropped to cause downstream system failure. In addition, when the amount of computing resources is fixed, the computing resources can be allocated to communication pipelines needed for first-received interactions. These communication pipelines then have more computing resources compared to if the computing resource is allocated to all the communication pipelines. With more computing resources, the communication pipelines can process the first-received interactions fast and reduce waiting time of later-arriving interactions. As a result, all the interactions can be processed efficiently to avoid interaction being dropped, which further prevents downstream system failure. Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
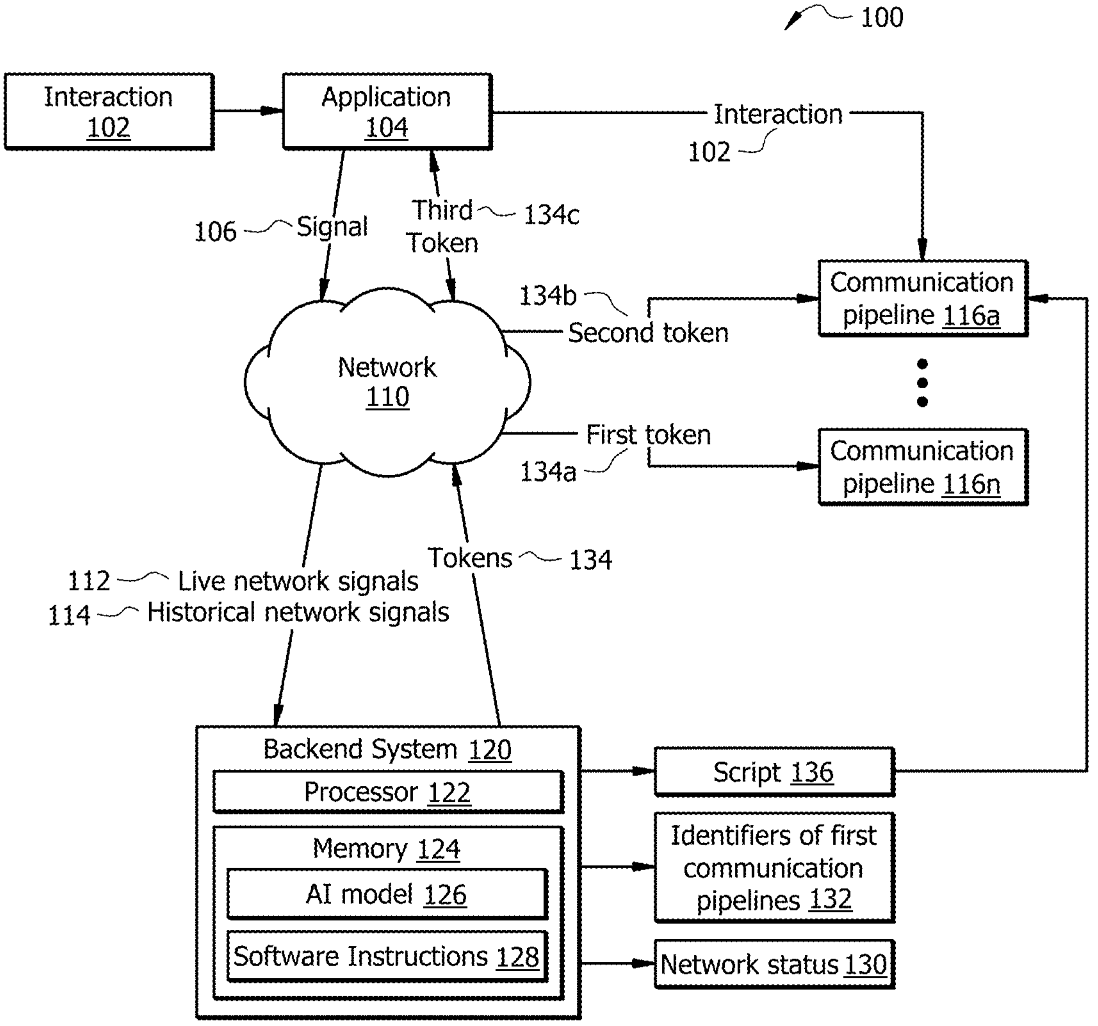
FIG. 1 illustrates one embodiment of a system that is configured for establishing and utilizing communication pipelines.
Figure 2A:
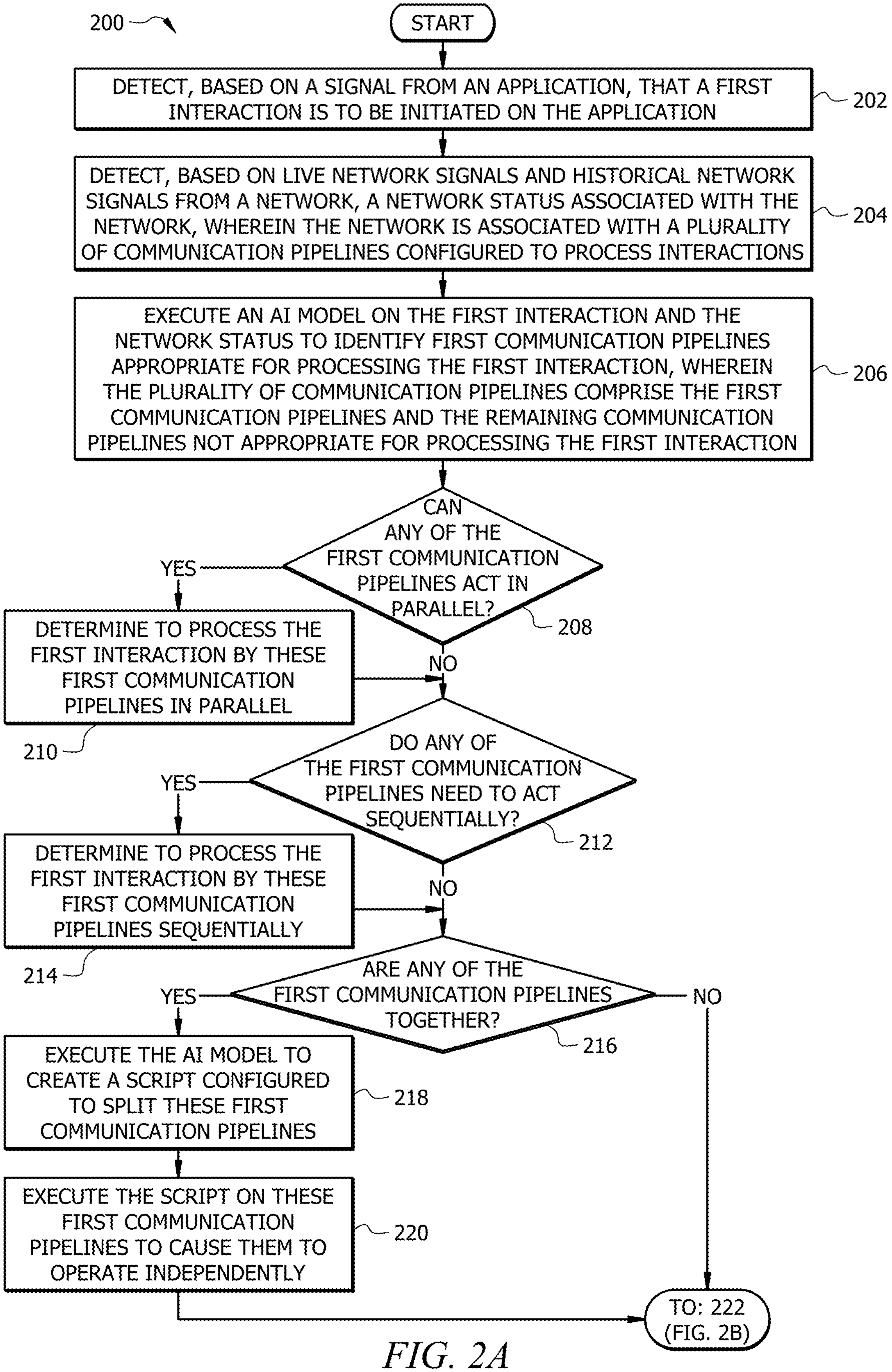
FIGS. 2A-2B illustrate an example flowchart of a method for establishing and utilizing communication pipelines.
Figure 2B:
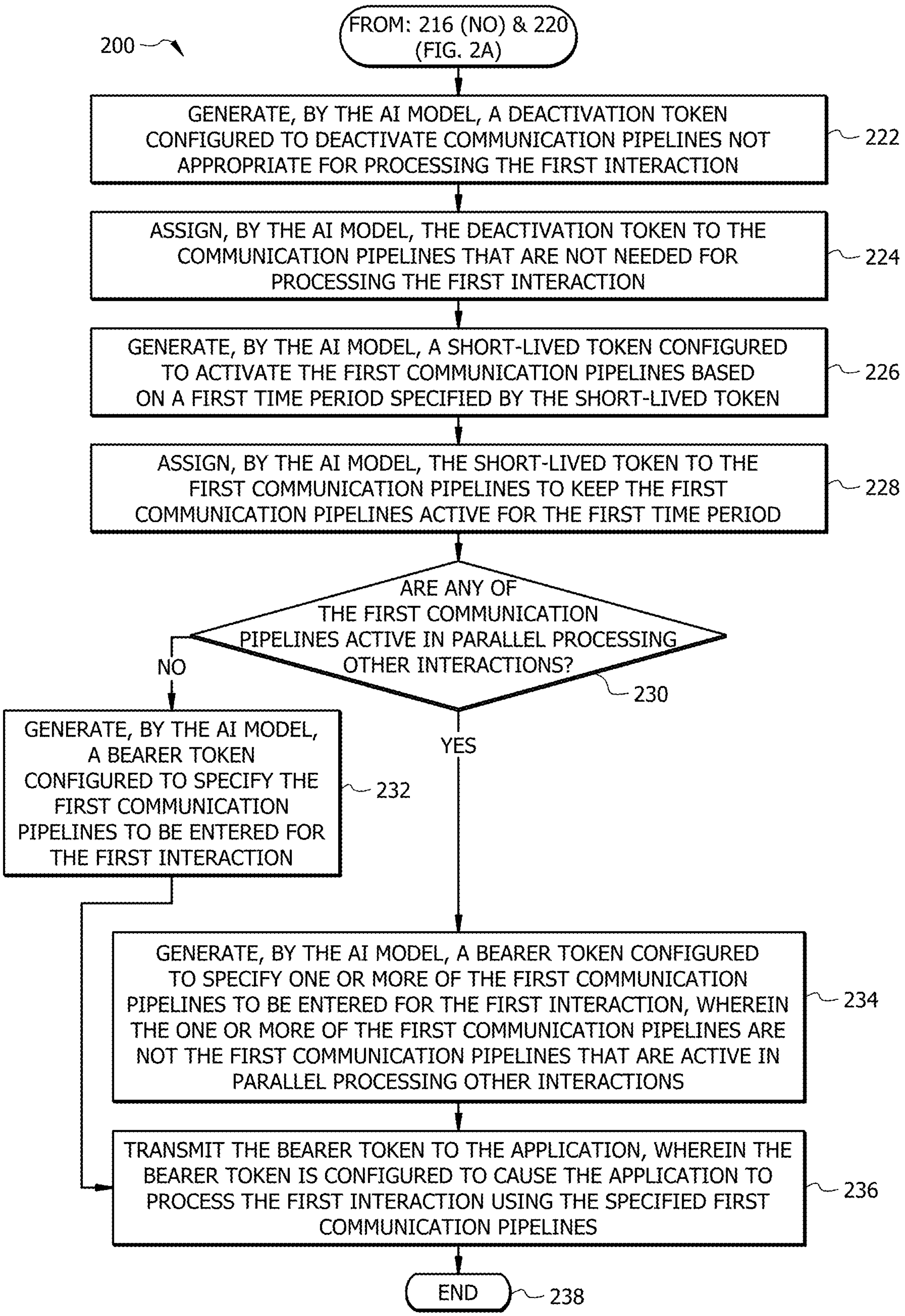

As described above, conventional systems utilizing communication pipelines cannot handle the complexity and volume of interactions. This disclosure provides various systems and methods to effectively establish and utilize communication pipelines according to the types of interactions and network status. FIG. 1 illustrates one embodiment of a system that is configured for establishing and utilizing communication pipelines. FIGS. 2A-2B illustrate an example flowchart of a method for establishing and utilizing communication pipelines.

Example System for Establishing and Utilizing Communication Pipelines

FIG. 1 illustrates one embodiment of a system 100 that is configured for establishing and utilizing communication pipelines. System 100 comprises an application 104, a network 110, and a backend system 120. In some embodiments, system 100 may not have all of the components listed and/or may have other elements instead of, or in addition to, those listed above.

Architecture Components

Application

Application 104 is generally any software that is configured to process data and communicate with devices, networks, (e.g., network 110), systems (e.g., backend system 120), etc. Application 104 can initiate interactions 102 and process interactions 102 using communication pipelines 116 associated with network 110. For example, application 104 may process an interaction 102 using a communication pipeline 116 configured for validation, a communication pipeline 116 configured for collection, a communication pipeline 116 configured for aggregation, a communication pipeline 116 configured for transformation, a communication pipeline 116 configured for correction, a communication pipeline 116 configured for formatting, a communication pipeline 116 configured for posting, and a communication pipeline 116 configured for provisioning. As another example, application 104 may process another interaction 102 using communication pipelines 116 configured for validation, transformation, formatting, and posting.

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

In an embodiment, a plurality of communication pipelines 116 may be established via network 110. A communication pipeline 116 may refer to a series of connected components or processes that facilitate the transfer of data from one point to another, enabling streamlined data transmission and processing across network 110. A communication pipeline 116 may be considered a structured pathway for data to transmit through different network elements, following a defined sequence of operations.

Backend System

Backend system 120 is generally any device that is configured to process data and communicate with devices, networks (e.g., network 110), systems, etc. Backend system 120 is generally configured to perform operations described further below in conjunction with method 200 described in FIGS. 2A-2B. In an embodiment, backend system 120 comprises a processor 122 in signal communication with a memory 124.

Processor 122 comprises one or more processors operably coupled to the memory 124. Processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 122 may be a programmable logic device, a microcontroller, a microprocessor, or any suitable combination of the preceding. Processor 122 is communicatively coupled to and in signal communication with memory 124. Processor 122 is configured to process data. For example, processor 122 may be 8-bit, 16-bit, 32-bit, 64-bit or of any other suitable architecture. Processor 122 may include an arithmetic logic unit (ALU) for performing arithmetic and logic operations, processors register that supply operands to the ALU and store the results of ALU operations, and a control unit that fetches software instructions 128 from memory 124 and executes them by directing the coordinated operations of the ALU, registers and other components. Processor 122 is configured to implement various software instructions 128. For example, processor 122 is configured to execute software instructions 128 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. Memory 124 is operable to store the software (e.g., AI model 126), and/or any other data or software instructions 128.

AI model 126 may be executed by processor 122 to effectively establish and utilize communication pipelines 116. AI model 126 can be any suitable model, including but not limited to, a machine-learning model, a deep-learning model, a generative AI model, or a large language model. AI model 126 is trained to determine what communication pipeline(s) 116 need to be used to process interaction 102 efficiently using limited computing and network resources. AI model 126 is trained on a training dataset comprising a plurality of training data. The training data may be generated from interactions 102 of different types, applications 104 that support these interaction types, communication pipelines 116 that are aligned to each application 104 and interaction type. For example, the training data may be generated from logs indicating how an interaction 102 went through a number of applications 104 and the communication pipelines 116 involved in each application 104. AI model 126 is continuously trained on any pipeline changes and how long a communication pipeline 116 is used for an interaction type. In an embodiment, AI model 126 may be trained using reinforcement learning (RL) based application agents. For example, a pre-trained AI model 126 may be trained from the training data using supervised learning. An application agent then uses the pre-trained AI model to determine what communication pipelines to use for an interaction 102. By processing the interaction 102 through the determined communication pipelines, the application agent can get feedback. The application agent further uses the feedback to finetune the hyperparameters of the pre-trained AI model. The trained AI model 126 may use a decision tree to determine what communication pipeline(s)

116 need to be used to process interaction 102 efficiently using limited computing and network resources.

Software instructions 128 may comprise any suitable set of instructions, logic, rules, or code operable to execute processor 122. Software instructions 128, when executed by processors 122, cause processor 122 to perform one or more functions described herein. For example, when software instructions 128 are executed, processor 122 executes AI model 126 to analyze interaction 102 to determine the type of interaction 102 and identify which communication pipeline(s) 116 are appropriate for processing interaction 102 based on the interaction type. When software instructions 128 are executed, processor 122 further executes AI model 126 to predict network status 130 of network 110 and establish adaptive communication pipelines 116 according to network status 130. When software instructions 128 are executed, processor 122 further execute software instructions 128 to generate bearer tokens for auto orchestration of interaction 102 to the right communication pipeline(s) 116 and short-lived tokens to make these communication pipeline(s) 116 active for the time period indicated in the short-lived tokens.

Operational Flow

Interaction 102 may need to initialize on application 104. Application 104 may send a signal 106 to backend system 120 via network 110. Signal 106 may indicate that interaction 102 is to be initiated on application 104. Signal 106 may additionally include details associated with interaction 102 like interaction type, data size, the number of calls required, etc.

Upon receiving signal 106, backend system 120 may predict network status 130 of network 110. To predict network status 130, backend system 120 may access live network signals 112 and historical network signals 114 from network 110. Backend system 120 may further use a machine-learning model, e.g., random forest, to analyze live network signals 112 and historical network signals 114 and predict network status 130 accordingly. For example, network status 130 may indicate both current and predicted congestions. In an embodiment, network status 130 may indicate that network 110 has an available bandwidth lower than a threshold bandwidth.

Based on the predicted network status 130, backend system 120 may load AI model 126 from memory 124 for execution. In an alternative embodiment, application 104 may send an API call to AI model 126 for execution by backend system 120.

Backend system 120 may execute AI model 126 on interaction 102 and network status 130 to identify one or more first communication pipelines 116*a* appropriate for processing interaction 102. In other words, AI model 126 may output identifiers 132 of first communication pipelines that are appropriate for processing interaction 102.

In an embodiment, backend system 120 may classify the operation mode of the first communication pipelines 116*a*. For example, backend system 120 may use custom python based Naïve Bayes machine-learning model to determine that some of the first communication pipelines 116*a* can operate in parallel and some of the first communication pipelines 116*a* need to operation sequentially.

In an embodiment, backend system 120 may identify communication pipelines 116 that are connected, and work unified instead of operating independently. Accordingly, backend system 120 may execute AI model 126 to create a script 136 configured to split the connected communication pipelines 116. Backend system 10 may further execute the script 136 on the connected communication pipelines 116 to cause them to operate independently.

By executing AI model 126, backend system 120 may perform tokenization for the communication pipelines 116. In an embodiment, backend system 120 may generate tokens 134. Backend system 120 may generate a first token 134*a* and assign the first token 134*a* to communication pipelines 116 that are not needed for interaction 102. The first token 134 may be configured to deactivate the communication pipelines 116 that are not needed for interaction 102.

Backend system 120 may generate a second token 134*b* and assign the second token 134*b* to first communication pipelines 116*a* that are needed for interaction 102. The second token 134*b* is a short-lived token that can activate first communication pipelines 116*a* that are needed for interaction 102, keep these first communication pipelines 116*a* active for a token time period, and then deactivate these first communication pipelines 116*a* after the token time period. The second token 134*b* may be generated responsive to detecting that the network 110 has the available bandwidth lower than the threshold bandwidth. With the short-lived token, short-lived communication pipelines 116 can be created as network 110 has an available bandwidth lower than a threshold bandwidth. Short-lived communication pipelines 116 may also make network 110 lite.

Backend system 120 may generate a third token 134*c*, which is a bearer token. Backend system 120 may send the bearer token 134*c* either to application 104 or send interaction 102 to network 110 with the bearer token 134*c*. The bearer token 134*c* indicates the first communication pipeline(s) 116*a* to be entered if other first communication pipelines 116*a* are actively processing other interactions 102 in parallel.

When interaction 102 goes through the first communication pipelines 116*a*, it presents the bearer token 134*c*. Using the bearer token 134*c*, application 104 can recognize which short-lived first communication pipeline(s) 116*a* the interaction 102 needs to be sent. If some of the first communication pipeline(s) 116*a* can process interactions 102 in parallel, these first communication pipeline(s) 116*a* may process interaction 102 in parallel. If some of the first communication pipeline(s) 116*a* need to process interactions 102 sequentially, these first communication pipeline(s) 116*a* may process interaction 102 sequentially.

In an embodiment, backend system 120 may prioritize interactions 102 in congested networks 110 with the use of tokens 134 being part of the interactions 102. Backend system 120 may determine a priority of the interaction 102 is lower than a threshold level. Backend system 120 may generate, by executing the AI model 126, a fourth token 134 configured to suspend a processing of the interaction 102 for a time period specified by the fourth token 134. Backend system 120 may further transmit the fourth token 134 to application 104. The fourth token 134 is configured to cause application 104 to suspend the processing of the interaction 102 using the selected communication pipelines 116 for the time period specified by the fourth token 134.

Example Methods for Establishing and Utilizing Communication Pipelines

FIGS. 2A-2B illustrate an example flowchart of a method 200 for establishing and utilizing communication pipelines. Modifications, additions, or omissions may be made to method 200. Method 200 may include more, fewer, or other operations. For example, operations may be performed in parallel or in any suitable order. While at times discussed as backend system 120, or components of any of thereof performing operations, any suitable system or components of the system may perform one or more operations of the method 200. For example, one or more operations of method 200 may be implemented, at least in part, in the form of software instructions (e.g., software instructions 128 of FIG. 1), stored on non-transitory, tangible, machine-readable media (e.g., memory 124 of FIG. 1) that when run by one or more processors (e.g., processors 122 of FIG. 1) may cause the one or more processors to perform operations 202-236.

After start, backend system 120 detects, based on a signal 106 from an application 104, that a first interaction 102 is to be initiated on the application 104 at operation 202. Signal 106 may indicate that the first interaction 102 is to be initiated on application 104. Signal 106 may additionally include details associated with the first interaction 102 like interaction type, data size, the number of calls required, etc.

At operation 204, backend system 120 detects, based on live network signals 112 and historical network signals 114 from the network 110, a network status 130 associated with the network 110. The network 110 is associated with a plurality of communication pipelines 116 configured to process interactions 102. For example, each of the communication pipelines may be configured for validation, collection, aggregation, transformation, correction, formatting, posting, provisioning, etc. In an embodiment, backend system 120 may use a machine-learning model, e.g., random forest, to analyze live network signals 112 and historical network signals 114 to output a prediction of network status 130.

At operation 206, backend system 120 executes an AI model 126 on the first interaction 102 and the network status 130 to identify first communication pipelines 116*a* appropriate for processing the first interaction 102. In an embodiment, backend system 120 may load AI model 126 automatically after predicting network status 130. In another embodiment, application 104 may send an API call to AI model 126 so that it executes on backend system 120. The plurality of communication pipelines 116 may comprise the first communication pipelines 116*a* and the remaining communication pipelines 116 that are not appropriate for processing the first interaction 102.

At operation 208, backend system 120 determines whether any of the first communication pipelines 116*a* can act in parallel. For example, backend system 120 may use custom python based Naïve Bayes machine-learning model to identify which first communication pipelines 116*a* among the first communication pipelines 116*a* can operate in parallel. If any of the first communication pipelines 116*a* can act in parallel, method 200 proceeds to operation 210.

At operation 210, backend system 120 determines to process the first interaction 102 by the identified first communication pipelines 116*a* in parallel. If none of the first communication pipelines 116*a* can act in parallel or after operation 210, method 200 proceeds to operation 212.

At operation 212, backend system 120 determines whether any of the first communication pipelines 116*a* need to act sequentially. For example, backend system 120 may use custom python based Naïve Bayes machine-learning model to identify which first communication pipelines 116*a* among the first communication pipelines 116*a* need to operate sequentially. If any of the first communication pipelines 116*a* need to act sequentially, method 200 proceeds to operation 214.

At operation 214, backend system 120 determines to process the first interaction 102 by the identified first communication pipelines 116*a* sequentially.

If none of the first communication pipelines 116*a* need to act sequentially or after operation 214, method 200 proceeds to operation 216.

At operation 216, backend system 120 determines whether any of the first communication pipelines 116*a* are together, which means these first communication pipelines 116*a* are connected and work unified instead of operating independently. If any of the first communication pipelines 116*a* are together, method 200 proceeds to operation 218.

At operation 218, backend system 120 executes the AI model 126 to create a script 136 configured to split these first communication pipelines 116*a*.

At operation 220, backend system 120 executes the script 136 on these first communication pipelines 116*a* to cause them to operate independently. In other words, executing the script 136 may split the connected first communication pipelines 116*a*.

If none of the first communication pipelines 116*a* are together or after operation 220, method 200 proceeds to operation 222.

At operation 222, backend system 120 generates, by the AI model 126, a deactivation token 134*a* configured to deactivate communication pipelines 116 that are not appropriate for processing the first interaction 102.

At operation 224, backend system 120 assigns, by the AI model 126, the deactivation token 134*a* to the communication pipelines 116 that are not needed for processing the first interaction 102. The communication pipelines 116 that are not needed for interaction 102 are then deactivated after the deactivation token 134*a* is assigned.

At operation 226, backend system 120 generates, by the AI model 126, a short-lived token 134*b* configured to activate the first communication pipelines 116*a* based on a first time period specified by the short-lived token 134*b*. The short-lived token 134*b* can activate the first communication pipelines 116*a*, keep these first communication pipelines 116*a* active for a first time period specified by the short-lived token 134*b*, and then deactivate these first communication pipelines 116*a* after the first time period.

At operation 228, backend system 120 assigns, by the AI model 126*a*, the short-lived token 134*b* to the first communication pipelines 116*a* to keep the first communication pipelines 116*a* active for the first time period.

At operation 230, backend system 120 determines whether any of the first communication pipelines 116*a* are active in parallel processing other interactions 102. If none of the first communication pipelines 116*a* is active in parallel processing other interactions 102, method 200 proceeds to operation 232.

At operation 232, backend system 120 generates, by the AI model 126, a bearer token 134*c* configured to specify the first communication pipelines 116*a* to be entered for the first interaction 102. Method 200 then proceeds to operation 236.

If any of the first communication pipelines 116*a* are active in parallel processing other interactions 102, method 200 proceeds to operation 234.

At operation 234, backend system 120 generates, by the AI model 126, a bearer token 134*c* configured to specify one or more of the first communication pipelines 116*a* to be entered for the first interaction 102. The one or more of the first communication pipelines 116*a* are not the first communication pipelines 116*a* that are active in parallel processing other interactions 102.

At operation 236, backend system 120 transmits the bearer token 134*c* to the application 104. In an embodiment, backend system 120 may send interaction 102 to network 110 with the bearer token 134*c*. The bearer token 134*c* is configured to cause the application 104 to process the first interaction 102 using the specified first communication pipelines 116*a*.

Method 200 then ends at operation 238.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

The invention claimed is:

1. A system, comprising:

a memory operable to store an artificial-intelligence (AI) model trained from training data comprising a plurality of interactions, a plurality of applications capable of processing the plurality of interactions, and a plurality of communication pipelines designated to process each of the plurality of interactions by each of the plurality of applications, wherein training the AI model comprises learning relationships between the plurality of interactions, applications, and communication pipelines through iterative adjustments of hyperparameters of the AI model using one or more optimization algorithms; and a processor, operably coupled to the memory, and configured to:

detect, based on a signal from an application, that a first interaction is to be initiated on the application;

detect, based on live network signals and historical network signals from a network, a network status associated with the network, wherein the network is associated with a plurality of communication pipelines configured to process interactions;

execute the AI model on the first interaction and the network status to identify one or more first communication pipelines appropriate for processing the first interaction, wherein the plurality of communication pipelines comprise the first communication pipelines and remaining communication pipelines not appropriate for processing the first interaction;

generate, by the AI model, a first token representing a first command configured to deactivate the remaining communication pipelines;

assign, by the AI model, the first token to the remaining communication pipelines to deactivate the remaining communication pipelines;

generate, by the AI model, a second token representing a second command configured to activate the first communication pipelines based on a first time period specified by the second token;

assign, by the AI model, the second token to the first communication pipelines to keep the first communication pipelines active for the first time period;

generate, by the AI model, a third token representing a third command configured to specify one or more selected first communication pipelines of the first communication pipelines; and transmit the third token to the application, wherein the third token is configured to cause the application to process the first interaction using the selected first communication pipelines.

2. The system of claim 1, wherein the processor is further configured to:

identify a subset of the first communication pipelines that can process the first interaction in parallel, wherein the selected first communication pipelines comprise two or more of the subset of the first communication pipelines, and wherein the first interaction is processed by the two or more of the subset of the first communication pipelines in parallel.

3. The system of claim 1, wherein the processor is further configured to:

identify a subset of the first communication pipelines that process the first interaction sequentially, wherein the selected first communication pipelines comprise two or more of the subset of the first communication pipelines, and wherein the first interaction is processed by the two or more of the subset of the first communication pipelines sequentially.

4. The system of claim 1, wherein the processor is further configured to:

determine that two or more of the first communication pipelines are connected and work unified instead of operating independently;

execute the AI model to create a script configured to split the two or more of the first communication pipelines; and execute the script on the two or more of the first communication pipelines to cause the two or more of the first communication pipelines to operate independently.

5. The system of claim 1, wherein the network status indicates that the network has an available bandwidth lower than a threshold bandwidth, and wherein the second token is generated responsive to detecting that the network has the available bandwidth lower than the threshold bandwidth.

6. The system of claim 1, whether the processor is further configured to:

detect one or more of the first communication pipelines are actively processing one or more second interactions, wherein the third token is generated responsive to the detection, and wherein the selected first communication pipelines are from the remaining first communication pipelines.

7. The system of claim 1, wherein the network status indicates that the network has an available bandwidth lower than a threshold bandwidth, and wherein the processor is further configured to:

determine a priority of the first interaction is lower than a threshold level;

generate, by the AI model, a fourth token representing a fourth command configured to suspend a processing of the first interaction for a second time period specified by the fourth token; and transmit the fourth token to the application, wherein the fourth token is configured to cause the application to suspend the processing of the first interaction using the selected first communication pipelines for the second time period.

8. A method, comprising:

detecting, based on a signal from an application, that a first interaction is to be initiated on the application;

detecting, based on live network signals and historical network signals from a network, a network status associated with the network, wherein the network is associated with a plurality of communication pipelines configured to process interactions;

executing an AI model on the first interaction and the network status to identify one or more first communication pipelines appropriate for processing the first interaction, wherein the plurality of communication pipelines comprise the first communication pipelines and remaining communication pipelines not appropriate for processing the first interaction, wherein the AI model was trained from training data comprising a plurality of interactions, a plurality of applications capable of processing the plurality of interactions, and a plurality of communication pipelines designated to process each of the plurality of interactions by each of the plurality of applications, and wherein training the AI model comprises learning relationships between the plurality of interactions, applications, and communication pipelines through iterative adjustments of hyperparameters of the AI model using one or more optimization algorithms;

generating, by the AI model, a first token representing a first command configured to deactivate the remaining communication pipelines;

assigning, by the AI model, the first token to the remaining communication pipelines to deactivate the remaining communication pipelines;

generating, by the AI model, a second token representing a second command configured to activate the first communication pipelines based on a first time period specified by the second token;

assigning, by the AI model, the second token to the first communication pipelines to keep the first communication pipelines active for the first time period;

generating, by the AI model, a third token representing a third command configured to specify one or more selected first communication pipelines of the first communication pipelines; and transmitting the third token to the application, wherein the third token is configured to cause the application to process the first interaction using the selected first communication pipelines.

9. The method of claim 8, further comprising:

identifying a subset of the first communication pipelines that can process the first interaction in parallel, wherein the selected first communication pipelines comprise two or more of the subset of the first communication pipelines, and wherein the first interaction is processed by the two or more of the subset of the first communication pipelines in parallel.

10. The method of claim 8, further comprising:

identifying a subset of the first communication pipelines that process the first interaction sequentially, wherein the selected first communication pipelines comprise two or more of the subset of the first communication pipelines, and wherein the first interaction is processed by the two or more of the subset of the first communication pipelines sequentially.

11. The method of claim 8, further comprising:

determining that two or more of the first communication pipelines are connected and work unified instead of operating independently;

executing the AI model to create a script configured to split the two or more of the first communication pipelines; and executing the script on the two or more of the first communication pipelines to cause the two or more of the first communication pipelines to operate independently.

12. The method of claim 8, wherein the network status indicates that the network has an available bandwidth lower than a threshold bandwidth, and wherein the second token is generated responsive to detecting that the network has the available bandwidth lower than the threshold bandwidth.

13. The method of claim 8, further comprising:

detecting one or more of the first communication pipelines are actively processing one or more second interactions, wherein the third token is generated responsive to the detection, and wherein the selected first communication pipelines are from the remaining first communication pipelines.

14. The method of claim 8, wherein the network status indicates that the network has an available bandwidth lower than a threshold bandwidth, the method further comprising:

determining a priority of the first interaction is lower than a threshold level;

generating, by the AI model, a fourth token representing a fourth command configured to suspend a processing of the first interaction for a second time period specified by the fourth token; and transmitting the fourth token to the application, wherein the fourth token is configured to cause the application to suspend the processing of the first interaction using the selected first communication pipelines for the second time period.

15. A non-transitory computer-readable medium storing instructions that, when executed by one or more processors of a system, cause the one or more processors to:

detect, based on a signal from an application, that a first interaction is to be initiated on the application;

detect, based on live network signals and historical network signals from a network, a network status associated with the network, wherein the network is associated with a plurality of communication pipelines configured to process interactions;

execute an AI model on the first interaction and the network status to identify one or more first communication pipelines appropriate for processing the first interaction, wherein the plurality of communication pipelines comprise the first communication pipelines and remaining communication pipelines not appropriate for processing the first interaction, wherein the AI model was trained from training data comprising a plurality of interactions, a plurality of applications capable of processing the plurality of interactions, and a plurality of communication pipelines designated to process each of the plurality of interactions by each of the plurality of applications, and wherein training the AI model comprises learning relationships between the plurality of interactions, applications, and communication pipelines through iterative adjustments of hyperparameters of the AI model using one or more optimization algorithms;

generate, by the AI model, a first token representing a first command configured to deactivate the remaining communication pipelines;

assign, by the AI model, the first token to the remaining communication pipelines to deactivate the remaining communication pipelines;

generate, by the AI model, a second token representing a second command configured to activate the first communication pipelines based on a first time period specified by the second token;

assign, by the AI model, the second token to the first communication pipelines to keep the first communication pipelines active for the first time period;

generate, by the AI model, a third token representing a third command configured to specify one or more selected first communication pipelines of the first communication pipelines; and transmit the third token to the application, wherein the third token is configured to cause the application to process the first interaction using the selected first communication pipelines.

16. The non-transitory computer-readable medium of claim 15, wherein the instructions further cause the processor to:

identify a subset of the first communication pipelines that can process the first interaction in parallel, wherein the selected first communication pipelines comprise two or more of the subset of the first communication pipelines, and wherein the first interaction is processed by the two or more of the subset of the first communication pipelines in parallel.

17. The non-transitory computer-readable medium of claim 15, wherein the instructions further cause the processor to:

identify a subset of the first communication pipelines that process the first interaction sequentially, wherein the selected first communication pipelines comprise two or more of the subset of the first communication pipelines, and wherein the first interaction is processed by the two or more of the subset of the first communication pipelines sequentially.

18. The non-transitory computer-readable medium of claim 15, wherein the instructions further cause the processor to:

determine that two or more of the first communication pipelines are connected and work unified instead of operating independently;

execute the AI model to create a script configured to split the two or more of the first communication pipelines; and execute the script on the two or more of the first communication pipelines to cause the two or more of the first communication pipelines to operate independently.

19. The non-transitory computer-readable medium of claim 15, wherein the network status indicates that the network has an available bandwidth lower than a threshold bandwidth, and wherein the second token is generated responsive to detecting that the network has the available bandwidth lower than the threshold bandwidth.

20. The non-transitory computer-readable medium of claim 19, wherein the instructions further cause the processor to:

detect one or more of the first communication pipelines are actively processing one or more second interactions, wherein the third token is generated responsive to the detection, and wherein the selected first communication pipelines are from the remaining first communication pipelines.

* * * * *